US012809245B2

(12) United States Patent
Yu et al.

(10) Patent No.: US 12,809,245 B2
(45) Date of Patent: Nov. 24, 2026

(54) COLOR PROJECTION LAMP CAPABLE OF CHANGING DYNAMICALLY IN STRIPE SHAPE, CONTROL METHOD THEREOF, AND AUTOMOBILE

(71) Applicant: Dongguan Hirosawa Automotive Trim Co., Ltd., Guangdong Province (CN)

(72) Inventors: Che-Ming Yu, Taoyuan City (TW); Wu Chuan Chuang, Hsinchu City (TW)

(73) Assignee: Dongguan Hirosawa Automotive Trim Co., Ltd., Guangdong Province (CN)

( * ) Notice: Subject to any disclaimer, the term of this patent is extended or adjusted under 35 U.S.C. 154(b) by 375 days.

(21) Appl. No.: 18/677,921

(22) Filed: May 30, 2024

(65) Prior Publication Data

US 2025/0314953 A1 Oct. 9, 2025

(30) Foreign Application Priority Data

Apr. 8, 2024 (CN) ......................... 202410414998.3

(51) Int. Cl.
*G03B 21/20* (2006.01)
*B60Q 3/74* (2017.01)
(Continued)

(52) U.S. Cl.
CPC ........... *G03B 21/2033* (2013.01); *B60Q 3/74* (2017.02); *B60Q 3/78* (2017.02); *B60Q 3/80* (2017.02);
(Continued)

(58) Field of Classification Search
CPC ............ G03B 21/2033; G03B 21/2013; G03B 21/206; G03B 21/208; B60Q 3/74;
(Continued)

(56) References Cited

U.S. PATENT DOCUMENTS 10,007,051 B2 * 6/2018 Xu ....................... G02B 6/0053
2021/0323410 A1 * 10/2021 Huber .................... B60K 35/22

FOREIGN PATENT DOCUMENTS

CN 204821306 12/2015
CN 213362304 6/2021
(Continued)

OTHER PUBLICATIONS

English translation of Sasaki JP-2023019563-A (Year: 2023).*
English translation of Cho KR-20170062858-A (Year: 2017).*

*Primary Examiner* — Evan P Dzierzynski
(74) *Attorney, Agent, or Firm* — JCIPRNET

(57) ABSTRACT

A color projection lamp capable of changing dynamically in stripe shape is disclosed, including a projection reflector, a shading bracket, a PCB board, and a lens assembly. The shading bracket is disposed obliquely on the projection reflector, the PCB board is disposed at a rear side of the shading bracket, multiple LED units are electrically connected to the PCB board, each LED unit is provided with an IC chip and three light-emitting modules, the three light-emitting modules are a red light-emitting module, a blue light-emitting module, and a green light-emitting module, and the three light-emitting modules are arranged in sequence in a vertical direction. The lens assembly is disposed at a front end of the shading bracket, and the lens assembly includes multiple lenses disposed in one-to-one correspondence with the LED units. A control method for the color projection lamp and an automobile having the color projection lamp are disclosed.

10 Claims, 5 Drawing Sheets

(51) Int. Cl.
*B60Q 3/78* (2017.01)
*B60Q 3/80* (2017.01)

(52) U.S. Cl.
CPC ....... *G03B 21/2013* (2013.01); *G03B 21/206* (2013.01); *G03B 21/208* (2013.01)

(58) Field of Classification Search
CPC ........ B60Q 3/78; B60Q 3/80; F21W 2106/00; F21W 2107/10; F21Y 2115/10; F21V 19/001; F21V 11/14; F21V 23/00; F21V 23/003; F21V 7/00; F21S 10/00; H05B 45/10; H05B 45/20; H05B 45/30; H05B 47/165
See application file for complete search history.

(56) References Cited

FOREIGN PATENT DOCUMENTS

| | | | | |
|---|---|---|---|---|
| JP | 2023019563 | A | * | 2/2023 |
| KR | 20170062858 | A | * | 6/2017 |

* cited by examiner

A

COLOR PROJECTION LAMP CAPABLE OF CHANGING DYNAMICALLY IN STRIPE SHAPE, CONTROL METHOD THEREOF, AND AUTOMOBILE

CROSS-REFERENCE TO RELATED APPLICATION

This application claims the priority benefit of China application serial no. 202410414998.3, filed on Apr. 8, 2024. The entirety of the above-mentioned patent application is hereby incorporated by reference herein and made a part of this specification.

BACKGROUND

Technical Field

This disclosure relates to a field of automotive ambient light, and in particular to a color projection lamp capable of changing dynamically in stripe shape, a control method thereof, and an automobile.

Description of Related Art

The popularity of the car makes people's demand for car personalization and comfort is also improving, the car is no longer just a simple means of transport, but a place that can bring comfort and coziness to people. Automotive ambient light as a car interior, play a decorative role in the lighting, mainly to create a comfortable car atmosphere, improve the driving experience, enhance the quality of the car.

Most of the existing automotive ambient lights only have color changes, such as the China utility model patent CN213362304U, which discloses an automotive ambient light assembly and automobiles; and the China utility model patent CN204821306U, which discloses automotive ambient lights and automobiles. The automotive ambient lights of the above two prior art are only to achieve the color change of the ambient light, and the ambient light has fewer changeable elements, which makes it difficult to meet the different needs of consumers.

Therefore, in response to the above technical problems, the disclosure proposes a color projection lamp capable of changing dynamically in stripe shape, a control method thereof, and an automobile.

SUMMARY

The purpose of the disclosure is to solve the monotonous effect of light change of automotive ambient light in the prior art, and to propose a color projection lamp capable of changing dynamically in stripe shape, a control method thereof, and an automobile.

The disclosure provides a color projection lamp capable of changing dynamically in stripe shape, including a projection reflector, a shading bracket, a PCB board, and a lens assembly. The shading bracket is disposed obliquely on the projection reflector and an angle between a front end surface of the shading bracket and an upper surface of the projection reflector is an acute angle, the PCB board is disposed at a rear side of the shading bracket and the PCB board is parallel to the shading bracket, multiple LED units are electrically connected to the PCB board, each of the LED units is provided with an IC chip and three light-emitting modules, the three light-emitting modules are a red light-emitting module, a blue light-emitting module, and a green light-emitting module, the three light-emitting modules are arranged in sequence in a vertical direction, the lens assembly is disposed at a front end of the shading bracket, and the lens assembly includes multiple lenses. The lenses are disposed in a one-to-one correspondence with the LED units.

Furthermore, the shading bracket is provided with a shading chamber corresponding to the each of the LED units, the shading chamber includes a light inlet and a light outlet, the LED unit is disposed at the light inlet, and the lens is disposed at the light outlet.

Furthermore, an area of the light inlet is larger than an area of the light outlet.

Furthermore, a mounting base is disposed on the rear side of the shading bracket, and the PCB board is fixedly disposed on the mounting base.

Furthermore, a light shading cover is disposed on a front side of the shading bracket, multiple light-transmitting holes are formed on the light shading cover, and the light-transmitting holes are disposed in one-to-one correspondence with the LED units.

Furthermore, at least part of the light-transmitting holes has different heights.

Furthermore, at least part of the light-transmitting holes has different widths.

Furthermore, an angle between the front end surface of the shading bracket and the upper surface of the projection reflector is 87° to 65°.

On the other hand, the disclosure further provides a control method for a color projection lamp capable of changing dynamically in stripe shape according to any one of the above items. LED units may enter any of the following states under control of an IC chip inside the LED units:

- state 1: three light-emitting modules of the LED units are not lighted;
- state 2: one of the three light-emitting modules of the LED units is lighted and two of the light-emitting modules are not lighted;
- state 3: two of the three light-emitting modules of the LED units are lighted and one light-emitting module 42 is not lighted;
- state 4: the three light-emitting modules of the LED units 4 are all lighted; and
- each IC chip dynamically controls the corresponding LED unit to enter any state from state 1 to state 4, so that the color projection lamp may achieve dynamic strip changes.

On the other hand, the disclosure also provides an automobile, including a color projection lamp capable of changing dynamically in stripe shape according to any one of the above items.

Beneficial effects of the disclosure:

(1) in the color projection lamp of the disclosure, by disposing the PCB board obliquely with respect to the projection reflector and by arranging the three light-emitting modules in sequence in the vertical direction, the three light-emitting modules form strip lights of different colors and of different lengths in the projection reflector; the IC chip inside the each of the LED units dynamically controls specific light-emitting states of the red light-emitting module, the blue light-emitting module, and the green light-emitting module in the LED units, that is, dynamically controls whether they are bright or not, the light projected by the color projection lamp may appear as dynamic strip change in length and color, which increases the diversity of changes of the color projection lamp;

(2) the color projection lamp is only provided with components such as the projection reflector, the shading bracket, the PCB board, the LED unit, and the lens assembly. Through the clever installation method between the components, the dynamic strip change of the light length and color of the color projection lamp may be realized, which is effective and low-cost;

(3) The front side of the shading bracket is provided with a light shading cover, and the light shading cover is provided with light-transmitting holes of different sizes, since the emitted light from the LED unit is inclined to the upper surface of the projection reflector, the different sizes of the light-transmitting holes have different degrees of blocking of the emitted light of the LED unit, thus making the light projected by the color projection lamp have further variations in terms of length and width, and making the dynamic variations of the color projection lamp more diversified.

To make the aforementioned more comprehensible, several embodiments accompanied with drawings are described in detail as follows.

BRIEF DESCRIPTION OF THE DRAWINGS

The drawings illustrate exemplary embodiments of the disclosure and, together with the description, serve to explain the principles of the disclosure.

DESCRIPTION OF THE EMBODIMENTS

Figure 1:
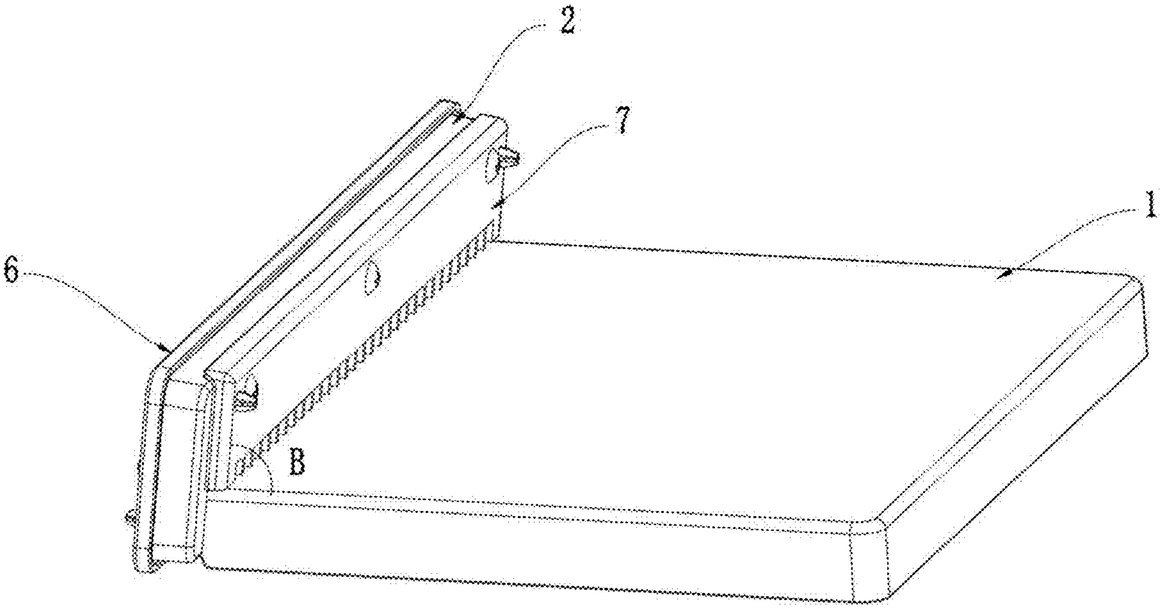
FIG. 1 is a schematic diagram of an overall structure of a color projection lamp of the disclosure.
Figure 2:
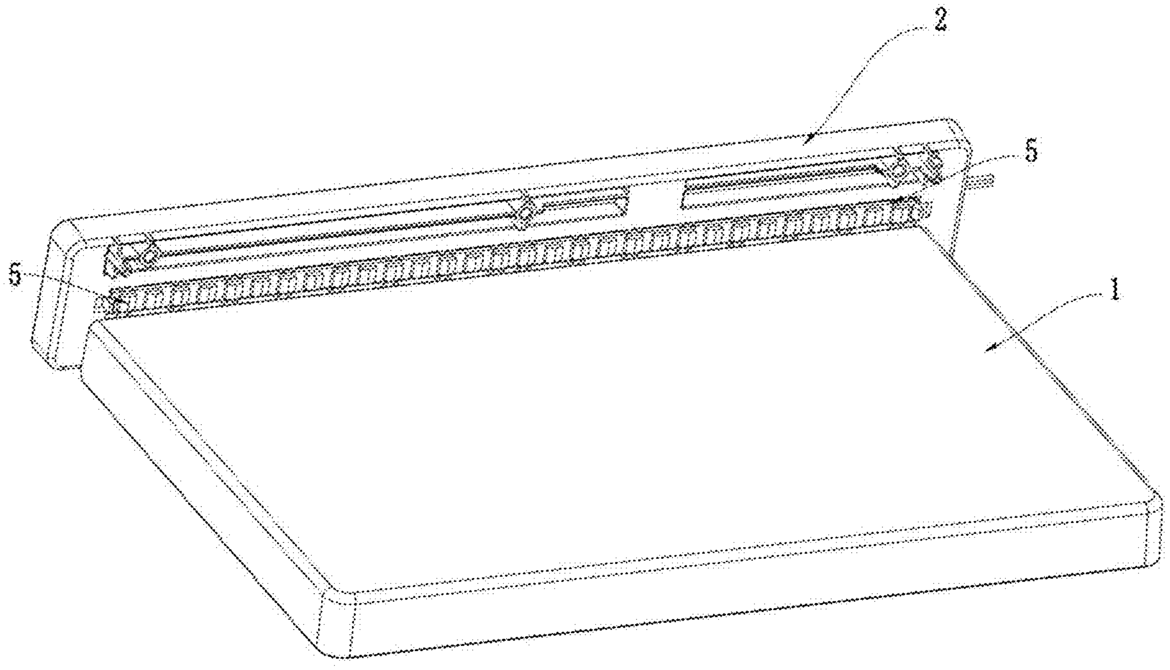
FIG. 2 is a schematic structural diagram of a front side of a shading bracket of the disclosure.
Figure 3:
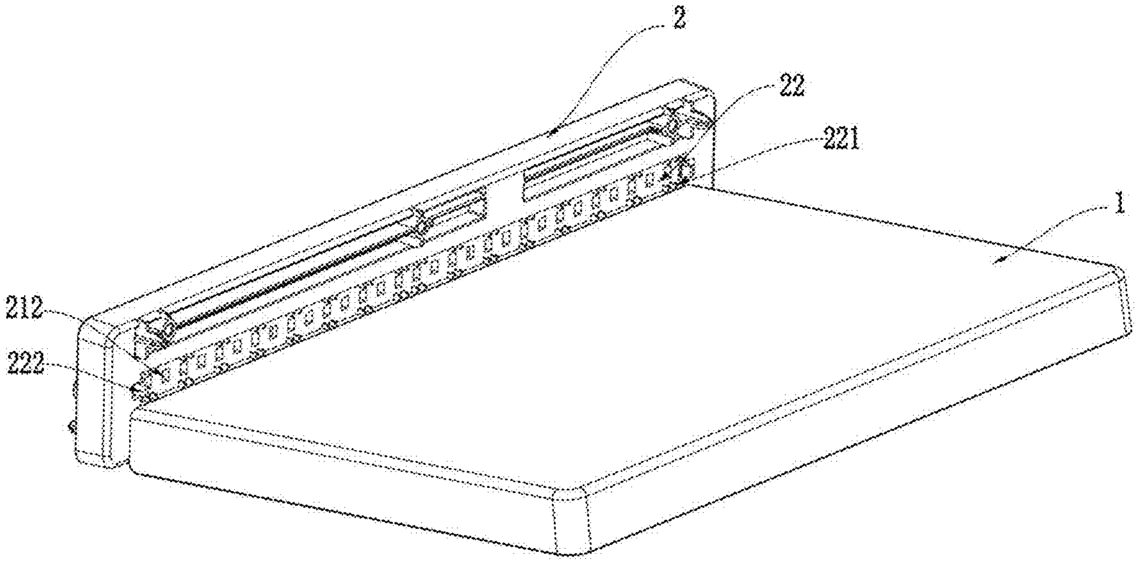
FIG. 3 is a schematic diagram of a partial structure of a front side of a shading bracket of the disclosure.
Figure 4:
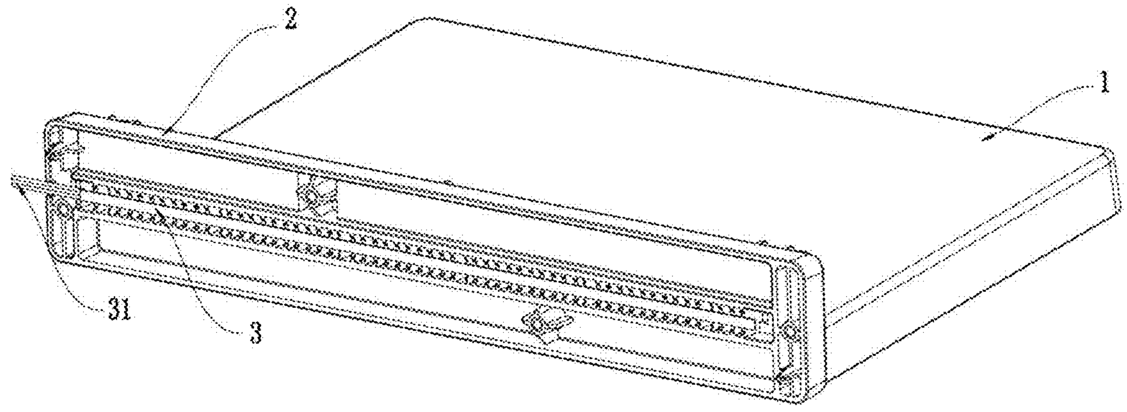
FIG. 4 is a schematic structural diagram of a rear side of a shading bracket of the disclosure.
Figure 5:
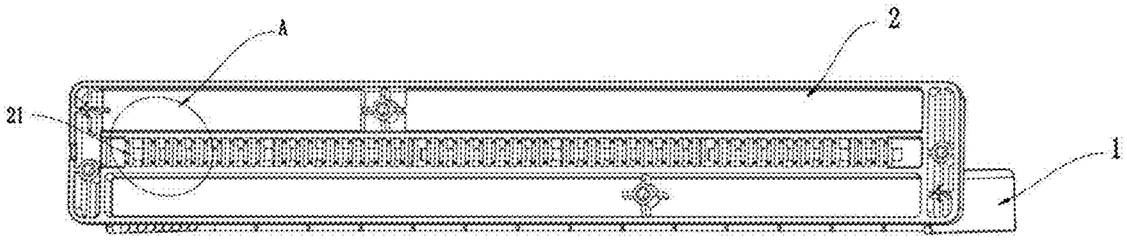
FIG. 5 is a schematic structural diagram of a rear side of a shading bracket of the disclosure.
Figure 6:
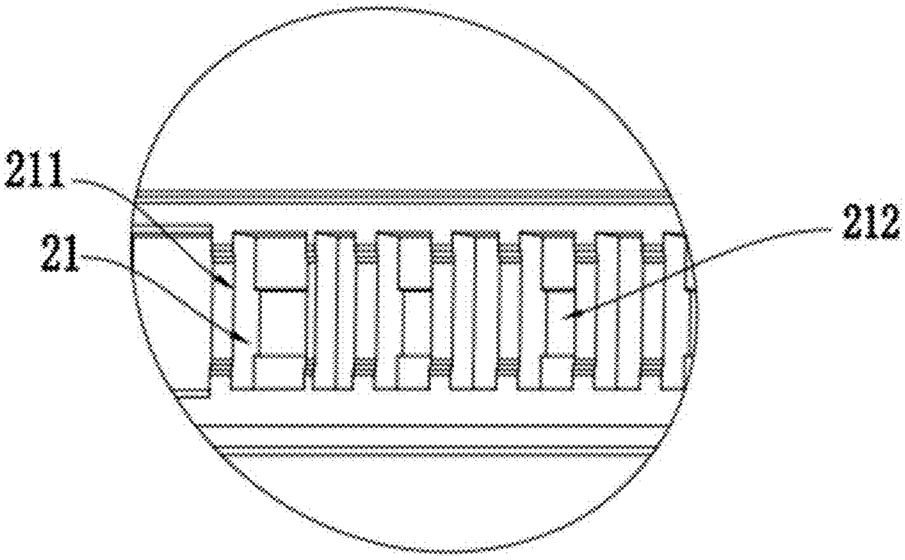
FIG. 6 is a schematic diagram of an enlarged structure of point A in FIG. 5.
Figure 7:
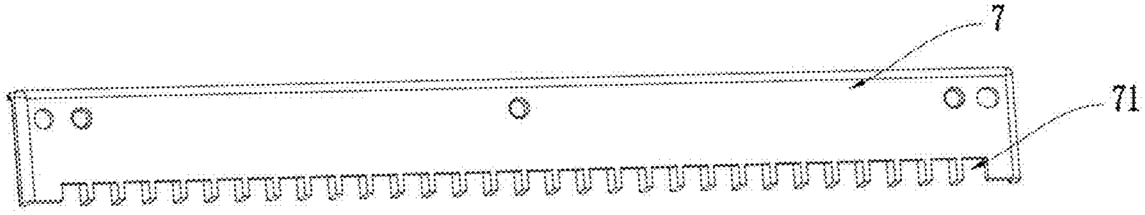
FIG. 7 is a schematic structural diagram of a light shading cover of the disclosure.
Figure 8:
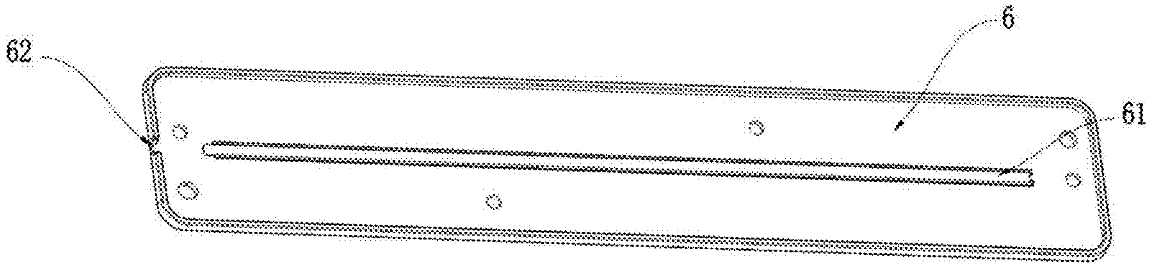
FIG. 8 is a schematic structural diagram of a mounting base of the disclosure.
Figure 9:
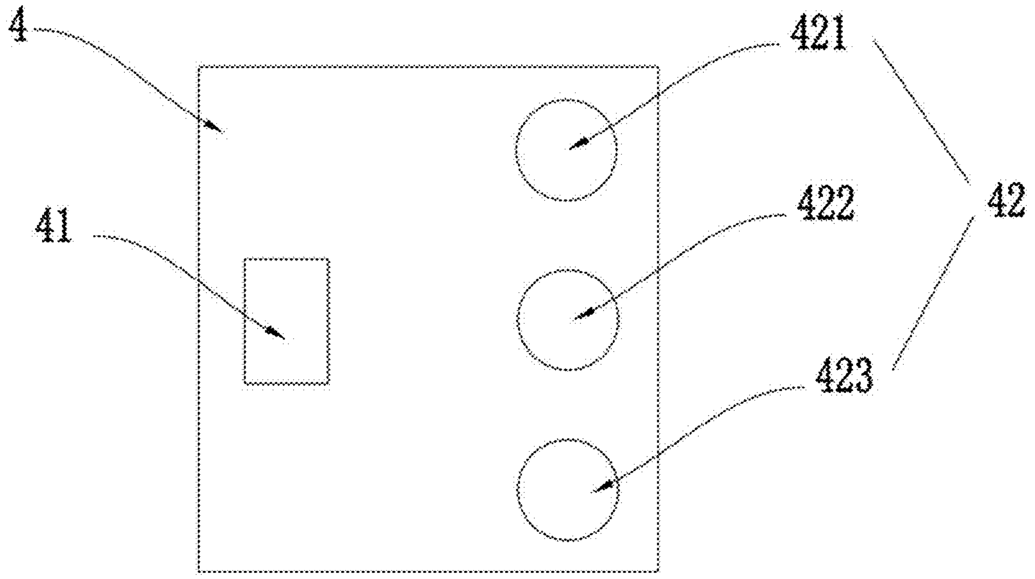
FIG. 9 is a schematic diagram of an arrangement structure of a light-emitting module in a LED unit of the disclosure.
Figure 10:
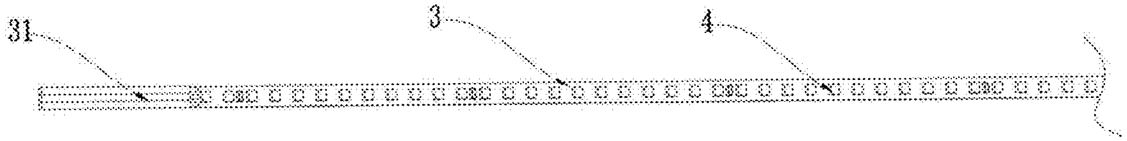
FIG. 10 is a schematic structural diagram of a PCB board and a LED unit of the disclosure.

In order to facilitate the understanding of those skilled in the art, the disclosure is further described below in conjunction with the embodiments and drawings, and the contents mentioned in the embodiments are not intended to limit the disclosure.

Embodiment 1

As shown in FIG. 1 to FIG. 13, the disclosure provides a color projection lamp capable of changing dynamically in stripe shape, including a projection reflector 1, a shading bracket 2, a PCB board 3, and a lens assembly 5. The shading bracket 2 is disposed obliquely on the projection reflector 1 and an angle B between a front end surface of the shading bracket 2 and an upper surface of the projection reflector 1 is an acute angle, the PCB board 3 is disposed at a rear side of the shading bracket 2 and the PCB board 3 is parallel to the shading bracket 2, multiple LED units 4 are electrically connected to the PCB board 3, each of the LED units 4 is provided with an IC chip 41 and three light-emitting modules 42, the three light-emitting modules 42 are a red light-emitting module 421, a blue light-emitting module 422, and a green light-emitting module 423, and the three light-emitting modules 42 are arranged in sequence in a vertical direction. The lens assembly 5 is disposed at a front end of the shading bracket 2, the lens assembly 5 includes multiple lenses 51, and the lenses 51 are disposed in one-to-one correspondence with the LED units 4.

In this embodiment, the specific arrangement order of the three light-emitting modules 42 is not limited. For example, the red light-emitting module 421, the blue light-emitting module 422, and the green light-emitting module 423 may be arranged in sequence from top to bottom, or the blue light-emitting module 422, the red light-emitting module 421, and the green light-emitting module 423 may be arranged in sequence from top to bottom, or the green light-emitting module 423, the blue light-emitting module 422, and the red light-emitting module 421 may be arranged in sequence from top to bottom, etc. Since the angle B between the front end surface of the shading bracket 2 and the upper surface of the projection reflector 1 is an acute angle, the PCB board 3 is disposed at the rear side of the shading bracket 2 and the PCB board 3 is parallel to the shading bracket 2, that is, the PCB board 3 is also disposed obliquely relative to the projection reflector 1, in which reflectivity of the projection reflector 1 is 20% to 60%. Since the three light-emitting modules 42 are arranged in sequence in the vertical direction, the three light-emitting modules 42 form strip lights of different colors and lengths in the projection reflector 1. When a single light-emitting module 42 is lighted, a strip light of the corresponding color appears. When more than two light-emitting modules 42 are lighted, more than two strip lights of different colors appear partially overlapped, and the partially overlapping strip lights make the light show colors other than red, blue, and green, for example, when red light and green light overlap, yellow light appears, and when red light and blue light overlap, purple light appears, etc., thus increasing the diversity of colors. Moreover, the color projection lamp in this embodiment has a simple structure, and is only provided with components such as the projection reflector 1, the shading bracket 2, the PCB board 3, the LED unit 4, and the lens assembly 5. Through the clever installation method between the components, the dynamic strip change of the light length and color of the color projection lamp may be realized, which is effective and low-cost. Preferably, the lens 51 is a plano-convex lens.

In actual use, the light emitted by each of the light-emitting modules 42 first passes through the shading bracket 2 to remove stray light, and then is focused and adjusted by the lens assembly 5, and finally forms strip lights of different colors and lengths on the projection reflector 1. The IC chip 41 inside the each of the LED units 4 dynamically controls specific light-emitting states of the red light-emitting module 421, the blue light-emitting module 422, and the green light-emitting module 423 in the LED units 4, that is, dynamically controls whether they are bright or not, the light projected by the color projection lamp may appear as dynamic strip change in length and color, which increases the diversity of changes of the color projection lamp.

Furthermore, a lens accommodating groove 22 is disposed on the front end surface of the shading bracket 2, multiple supporting blocks 221 are disposed on upper and lower sides of the lens accommodating groove 22, and a hook 222 is disposed on left and right sides of the lens accommodating groove 22. In this embodiment, the lens assembly 5 is inserted into the lens receiving groove 22, the supporting blocks 221 on the upper and lower sides limit upper and lower positions of the lens assembly 5, and the hooks 222 on the left and right sides limit left and right positions of the lens assembly 5, so that the lens assembly 5 is fixedly disposed to ensure that each of the lenses 51 in the lens assembly 5 is disposed close to a corresponding light outlet 212 and the each of the lenses 51 is disposed in one-to-one correspondence with the LED units 4.

Furthermore, the shading bracket 2 is provided with a shading chamber 21 corresponding to the each of the LED units 4, the shading chamber 21 includes a light inlet 211 and a light outlet 212, the LED unit 4 is disposed at the light inlet 211, and the lens 51 is disposed at the light outlet 212. Preferably, an area of the light inlet 211 is larger than an area of the light outlet 212.

In this embodiment, the area of the light inlet 211 is relatively large, so that the light inlet 211 may be covered around the LED unit 4, ensuring that all the light emitted by the LED unit 4 can enter the shading chamber 21. As the light-emitting module has a light-emitting angle of 120°, by setting the area of the light outlet 212 to be small, the stray light on both sides of the light-emitting module 42 is blocked out, and only the light of the middle portion passes through the light outlet 212 and enters the lens, to ensure the clarity of final projected light of the color projection lamp.

Furthermore, a mounting base 6 is disposed on the rear side of the shading bracket 2, and the PCB board 3 is fixedly disposed on the mounting base 6. Specifically, a mounting groove 61 is disposed on a surface of the mounting base 6 close to the shading bracket 2, the PCB board 3 is fixedly disposed in the mounting groove 61, and an avoidance opening 62 is disposed on a side wall of the mounting base 6 at a position corresponding to the mounting groove 61, so as to facilitate a wire 31 in the PCB board 3 to be led out of the mounting base 6. The mounting base 6 is disposed close to the rear side of the shading bracket 2, so as to ensure that an end surface of the PCB board 3 on which the LED unit 4 is mounted is disposed close to a rear end surface of the shading bracket 2, which is conducive to the smooth entry of all the light from the LED unit 4 into the interior of the shading bracket 2.

Furthermore, a light shading cover 7 is disposed on a front side of the shading bracket 2, multiple light-transmitting holes 71 are formed on the light shading cover 7, and the light-transmitting holes 71 are disposed in one-to-one correspondence with the LED units 4. At least part of the light-transmitting holes 71 has different heights, and at least part of the light-transmitting holes 71 has different widths.

Figure 11:
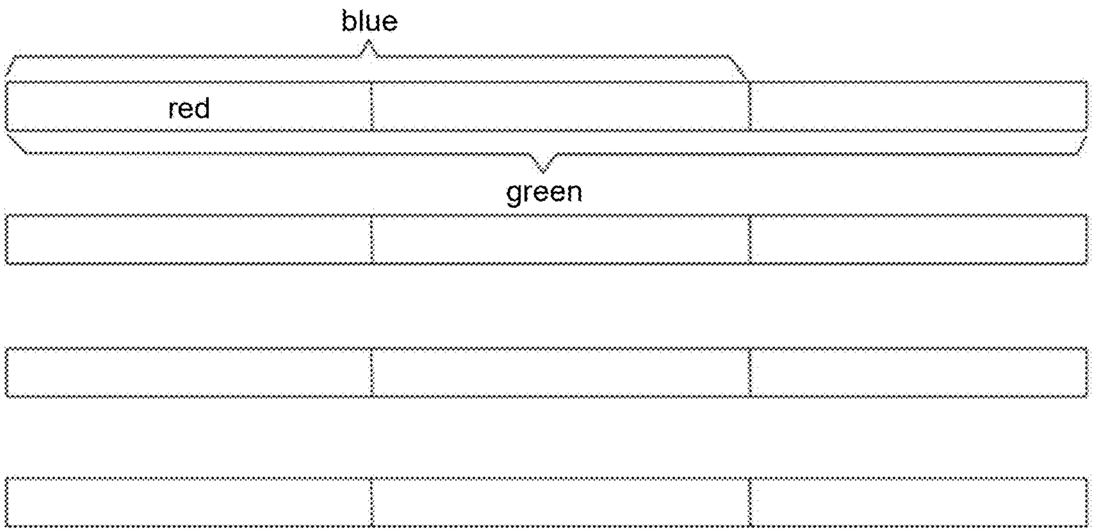
FIG. 11 is a schematic diagram of light projected when a color projection lamp of the disclosure is not provided with a light shading cover.
Figure 12:
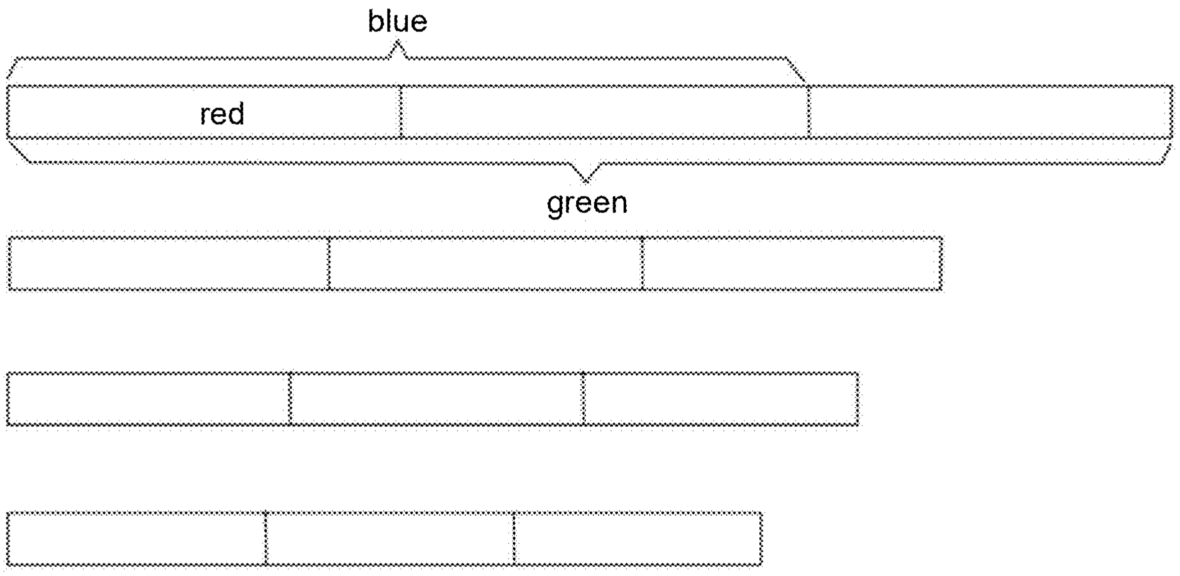
FIG. 12 is a schematic diagram of light projected when a color projection lamp of the disclosure is provided with a light shading cover and heights of light-transmitting holes are different.
Figure 13:
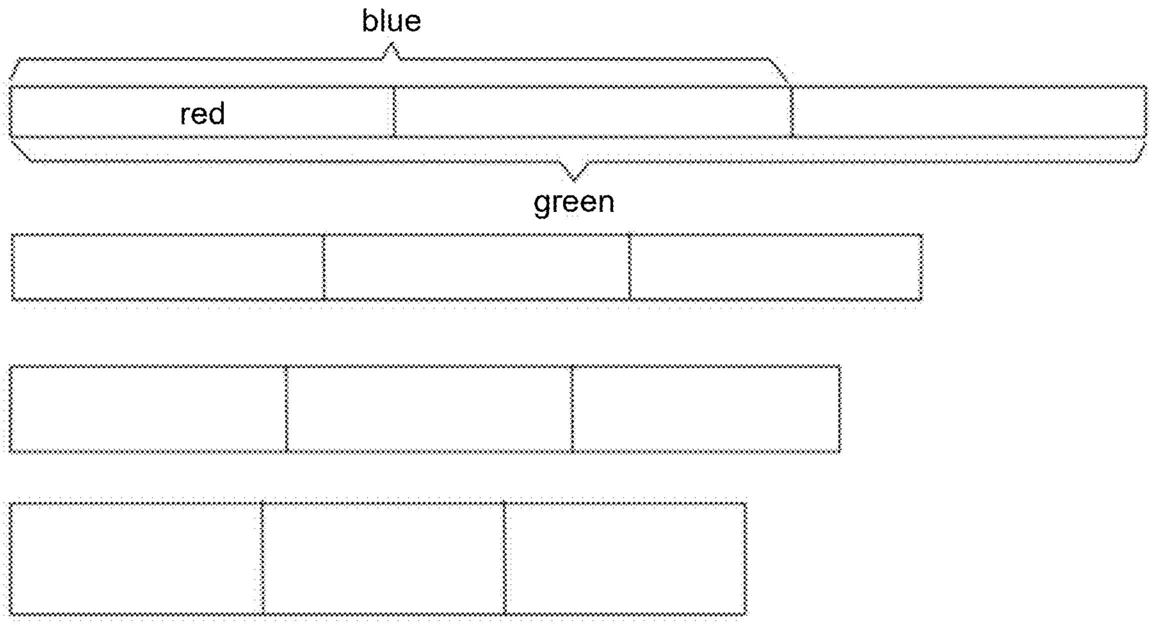
FIG. 13 is a schematic diagram of light projected when a color projection lamp of the disclosure is provided with a light shading cover and heights and widths of light-transmitting holes are different.

In this embodiment, by setting the light shading cover 7 on the front side of the shading bracket 2, the light emitted from the each of the LED units 4 is thereby shaded for a second time. Since the light-transmitting holes 71 are disposed in one-to-one correspondence with the LED units 4, the light-transmitting holes 71 are provided with different sizes so that the light-transmitting holes 71 have different degrees of shading for the corresponding LED units 4, thereby further changing the length and width of the projection of the light from the LED units 4 on the upper surface of the projection reflector 1, and further increasing the diversity of variations of the color projection lamp. If the light shading cover 7 is not disposed or the light-transmitting holes 71 on the light shading cover 7 are set to the same size, then the length and width of the lights projected onto the upper surface of the projection reflector 1 by the each of the LED units are the same (as shown in FIG. 11), for example, if the red light-emitting module 421 in the each of the LED units 4 is lighted, then multiple red stripe-shaped lights of the same length and width appear on the upper surface of the projection reflector 1 (as shown in FIG. 11). If the red light-emitting module 421 and the blue light-emitting module 422 in the each of the LED units 4 are both lighted, then multiple red and blue partially overlapping stripe-shaped lights of the same length and width appear on the upper surface of the projection reflector 1 (as shown in FIG. 11). When different sizes of light-transmitting holes 71 are disposed, since the emitted light from the LED unit 4 is inclined to the upper surface of the projection reflector 1, the higher the height of the light-transmitting holes 71, the longer the stripe-shaped light projected on the upper surface of the projection reflector 1 (as shown in FIG. 12 to FIG. 13), and the wider the width of the light-transmitting holes 71, the wider the stripe-shaped light projected on the upper surface of the projection reflector 1 (as shown in FIG. 13). For example, by setting the height of the light-transmitting holes 71 to change in a sequentially increasing or decreasing trend, a stripe-shaped light that changes in a circular arc shape may be realized on the upper surface of the projection reflector 1, which, together with the change in the width of the stripe-shaped light, results in a more diversified change in the dynamics of the color projection light.

Furthermore, an angle B between the front end surface of the shading bracket 2 and the upper surface of the projection reflector 1 is 87° to 65°. In this embodiment, by specifically defining the angle B between the front end surface of the shading bracket 2 and the upper surface of the projection reflector 1, the projection length of the light on the upper surface of the projection reflector 1 is specifically defined.

Example 2

The disclosure further provides a control method for any one of the color projection lamps capable of changing dynamically in stripe shape as described in embodiment 1. The LED unit 4 may enter any of the following states under the control of the IC chip 41 inside the LED unit 4.

State 1: the three light-emitting modules 42 of the LED unit 4 are not lighted.

State 2: one of the three light-emitting modules 42 of the LED unit 4 is lighted, and two of the light-emitting modules 42 are not lighted.

State 3: two of the three light-emitting modules 42 of the LED unit 4 are lighted and one light-emitting module 42 is not lighted.

State 4: the three light-emitting modules 42 of the LED unit 4 are all lighted.

Each IC chip 41 dynamically controls the corresponding LED unit 4 to enter any state from state 1 to state 4, so that the color projection lamp may achieve dynamic strip changes.

In this embodiment, the each IC chip 41 simultaneously controls the specific light-emitting states of the three light-emitting modules 42 of the each of the LED units 4, so that the color projection lamp may realize many kinds of strip-shaped dynamic changes, and several kinds of changes are described in detail below.

(1) Variation 1: when the each IC chip 41 simultaneously controls the three light-emitting modules 42 of the each of the LED units 4 to light up in sequence, such as controlling the each of the LED units 4 to light up in sequence in accordance with the order of the red light-emitting module 421, the blue light-emitting module 422, and the green light-emitting module 423, multiple red stripe lights of different lengths and widths, multiple blue stripe of lights of different lengths and widths, and multiple green strip of lights of different lengths and widths correspondingly appear in sequence on the upper surface of the projection reflector 1.

(2) Variation 2: when the each IC chip 41 simultaneously controls the three light-emitting modules 42 of the each of the LED units 4 to light up in the order of one light-emitting module 42, two light-emitting modules 42, and three light-emitting modules 42, such as controlling the each of the LED units 4 to light up in sequence in accordance with the order that the red light-emitting module 421 is lighted up, the red light-emitting module 421 and the blue light-emitting module 422 are lighted up, and the red light-emitting module 421, the blue light-emitting module 422, and the green light-emitting module 423 are all lighted up, multiple red stripe lights of different lengths and widths, multiple red and blue stripe of lights partially overlapping of different lengths and widths, and multiple red, blue, and green stripe of lights partially overlapping of different lengths and widths correspondingly appear in sequence on the upper surface of the projection reflector 1.

(3) Variation 3: based on variation 1, the each IC chip 41 controls the each of the LED units 4 to light up in sequence, such as firstly, the red light-emitting module 421 of the each of the LED units 4 from left to right are lighted up sequentially, the blue light-emitting module 422 of the each of the LED units 4 from left to right are lighted up sequentially, and the green light-emitting module 423 of the each of the LED units 4 from left to right are lighted up sequentially, then the upper surface of the projection reflector 1 is correspondingly presented with multiple red stripe of lights of different lengths and widths appearing from left to right, followed by multiple blue stripe of lights of different lengths and widths appearing from left to right, followed by multiple green stripe of light of different lengths and widths appearing from left to right, thus increasing the effect of flowing water on the basis of variation 3.

(4) Variation 4: when the each IC chip 41 simultaneously controls the light-emitting modules 42 lighted by the each of the LED units 4 to be different, such as controlling some LED units 4 to light up the red light-emitting module 421, some LED units 4 to light up the blue light-emitting module 422, some LED units 4 to light up the green light-emitting module 423, some LED units 4 to light up the red light-emitting module 421 and the blue light-emitting module 422, some LED unit 4 to light up the red light-emitting module 421, the blue light-emitting module 422, and the green light-emitting module, then multiple stripe of lights of different lengths, widths, and colors appear on the upper surface of the projection reflector 1.

In order to facilitate the understanding of those skilled in the art, several simple variations of this embodiment are briefly exemplified herein, and it should be noted that there are many other variations of this embodiment, which are not enumerated herein.

In this embodiment, the color projection lamp not only has a simple structure, but also has a simple control method, whereby the light-emitting state of the each of the light-emitting modules 42 in the each of the LED units 4 is controlled only by the each IC chip 41 to achieve the dynamic change of the stripe of the light projected by the color projection lamp in terms of color, length, and width, and the control is flexible and low-cost.

Example 3

The disclosure also provides an automobile, and the automobile includes any one of the color projection lamps capable of changing dynamically in stripe shape in embodiment 1.

In this embodiment, a color projection lamps capable of changing dynamically in stripe shape is disposed in the automobile. The color projection lamp is not only simple in structure, but also may enable the automotive ambient light to simultaneously realize simultaneous changes in the color of the projected light, the length of the light, and the width of the light through the simultaneous control by the each IC chip 41 of the three light-emitting modules 42 of the each of the LED units 4. Moreover, the each IC chip 41 controls the each of the LED units 4 to light up in sequence, so that the effect of flowing water may be achieved while the color, length, and width of the light change, thereby greatly increasing the diversity of dynamic changes in the automotive ambient light, meeting the needs of different consumers, and helping to improve the sense of luxury and grade of the interior of the automobile.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A color projection lamp capable of changing dynamically in stripe shape, comprising a projection reflector, a shading bracket, a PCB board, and a lens assembly, wherein the shading bracket is disposed obliquely on the projection reflector and an angle between a front end surface of the shading bracket and an upper surface of the projection reflector is an acute angle, the PCB board is disposed at a rear side of the shading bracket and the PCB board is parallel to the shading bracket, a plurality of LED units are electrically connected to the PCB board, each of the LED units is provided with an IC chip and three light-emitting modules, the three light-emitting modules are a red light-emitting module, a blue light-emitting module, and a green light-emitting module, the three light-emitting modules are arranged in sequence in a vertical direction, the lens assembly is disposed at a front end of the shading bracket, and the lens assembly comprises a plurality of lenses, wherein the lenses are disposed in one-to-one correspondence with the LED units.

2. The color projection lamp capable of changing dynamically in stripe shape according to claim 1, wherein the shading bracket is provided with a shading chamber corresponding to the each of the LED units, the shading chamber comprises a light inlet and a light outlet, the LED unit is disposed at the light inlet, and the lens is disposed at the light outlet.

3. The color projection lamp capable of changing dynamically in stripe shape according to claim 2, wherein an area of the light inlet is larger than an area of the light outlet.

4. The color projection lamp capable of changing dynamically in stripe shape according to claim 1, wherein a mounting base is disposed on the rear side of the shading bracket, and the PCB board is fixedly disposed on the mounting base.

5. The color projection lamp capable of changing dynamically in stripe shape according to claim 1, wherein a light shading cover is disposed on a front side of the shading bracket, a plurality of light-transmitting holes are formed on the light shading cover, and the light-transmitting holes are disposed in one-to-one correspondence with the LED units.

6. The color projection lamp capable of changing dynamically in stripe shape according to claim 5, wherein at least part of the light-transmitting holes has different heights.

7. The color projection lamp capable of changing dynamically in stripe shape according to claim 5, wherein at least part of the light-transmitting holes has different widths.

8. The color projection lamp capable of changing dynamically in stripe shape according to claim 1, wherein an angle between the front end surface of the shading bracket and the upper surface of the projection reflector is 87° to 65°.

9. A control method for a color projection lamp capable of changing dynamically in stripe shape according to claim 1, wherein LED units may enter any of the following states under control of an IC chip inside the LED units:

state 1: three light-emitting modules of the LED units are not lighted;

state 2: one of the three light-emitting modules of the LED units is lighted and two of the light-emitting modules are not lighted;

state 3: two of the three light-emitting modules of the LED units are lighted and one light-emitting module 42 is not lighted;

state 4: the three light-emitting modules of the LED units 4 are all lighted; and each IC chip dynamically controls the corresponding LED unit to enter any state from state 1 to state 4, such that the color projection lamp may achieve dynamic strip changes.

10. An automobile, comprising a color projection lamp capable of changing dynamically in stripe shape according to claim 1.

* * * * *